United States Patent Office 2,863,903
Patented Dec. 9, 1958

2,863,903

ALKYL ARYL MONOCHLOROMETHANE-PHOSPHONATE ESTERS

Arthur Dock Fon Toy, Park Forest, and Kenneth H. Rattenbury, Chicago Heights, Ill., assignors to Victor Chemical Works, a corporation of Illinois No Drawing. Application October 7, 1954
Serial No. 461,047

5 Claims. (Cl. 260—461)

This invention relates to a new class of mixed alkyl aryl monochloromethanephosphonate esters having unusual characteristics which make them highly suitable for use as plasticizing agents, hydraulic fluids and gasoline or lubricating oil additives.

The new ester compounds may be represented by the formula:

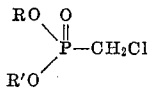

where R is selected from the group consisting of phenyl and cresyl radicals, and R' is an alkyl or chloroalkyl radical containing from 1 to 8 carbon atoms. The term cresyl radical as here employed includes compounds derived from the ortho, meta, or para methyl substituted phenols or commercial mixtures generally designated by the term "cresols." The scope of the term also includes the alkali metal cresylates.

In the preparation of the new esters monochloromethanephosphonic dichloride was first prepared by known means and this compound then reacted with a controlled amount of phenol or cresol under suitable esterifying conditions to form the phenyl or cresyl chloromethanephosphonochloridate which is subsequently reacted with an aliphatic monohydric alcohol under suitable esterifying conditions to form the final mixed alkyl aryl ester product. The reactions involved are more or less obvious in view of similar known reactions for the production of other mixed esters of phosphonic acid dichlorides. The reactions may be illustrated by the following equations:

(1)
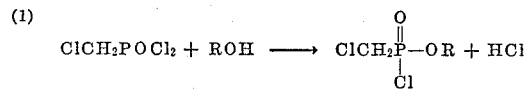

(2)
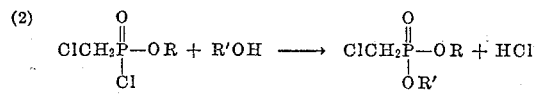

where R and R' are aryl and alkyl radicals respectively.

In the first step of the reaction the aryl or alkyl ester group may be readily introduced by the use of the alcohol or phenol with or without the use of sodium or other hydrogen chloride acceptor agent. In the second step the alkyl radical may be introduced by the use of alcohols with or without the use of an hydrogen chloride acceptor such as sodium or tertiary amine base. However, should the aryl group be introduced in the second step it is necessary to use an hydrogen chloride acceptor to prevent decomposition at the higher temperatures required to introduce the aryl radical. The use of a sodium phenolate or cresylate is preferred.

*Example I.*—Methyl cresyl monochloromethanephosphonate was prepared under the following two-step procedure.

*Step 1.*—Six moles (648.6 g.) of U. S. P. cresol and 1506.6 grams (6 moles+50% excess) of monochloromethanephosphonic dichloride were heated together to 110° C. in 1 hour, to 185° C. in 2.5 hours and up to 245° C. in another hour and maintained at this temperature overnight. The reaction mixture was then fractionated. After removal of the forerun the fraction coming over at 125–130° C. at 2 mm. represented the cresyl monochloromethanephosphonic chloride intermediate. It had an index of refraction $N_D^{25}=1.5319$, a density $$d_{25}^{25}=1.3361$$

and an analysis of 12.4% P and 29.5% Cl. The yield was 74.2%.

*Step 2.*—One mole plus 5% excess (33.6 grams) of methanol, 103.2 grams (1.02 moles) triethylamine and 400 ml. of dry benzene were stirred at 0–5° C. in an ice bath while 239.0 grams (1 mole) of cresyl monochloromethanephosphonic chloride, from Step 1, were added slowly over a period of 90 minutes. The reaction mixture was stirred for 2 hours while the temperature was allowed to rise to a maximum of 20–25° C. The mixture was then filtered and the filter cake washed twice with 100 ml. portions of benzene. The filtrate and washings were combined and the benzene and excess methanol stripped off. The crude ester product was distilled twice yielding 213.4 grams (91%) of water white methyl cresyl monochloromethanephosphonate having a boiling point of 107–111° C. at 0.5 mm. pressure, an index of refraction $N_D^{25}=1.5154$ and a density $$d_{25}^{25} \text{ of } 1.2548 \text{ grams/ml}$$

Analysis showed 13.0% P and 15.0% Cl compared to calculated values of 13.2% P and 15.15% Cl.

*Example II.*—Octyl phenyl monochloromethanephosphonate was prepared as follows:

In a 3-necked flask equipped with stirrer was placed 503.0 gms. (3.0 moles) of chloromethanephosphonic dichloride and the system cooled to 0° and evacuated to 40 mm. pressure. 390 gms. of 2-ethyl hexanol was added dropwise over approximately 3 hours while maintaining the temperature at 0–5° C. and 40 mm. pressure. The flask was then pumped overnight at 3 mm. pressure. The resulting octyl chloromethane phosphonyl chloride was obtained in a 99.5% yield having an index of refraction $N_D^{25}=1.4604$. This product was then reacted with sodium phenolate in the following manner. 765 gms. (2.93 moles) of the octyl chloromethanephosphonyl chloride was added dropwise to an aqueous 30% solution containing 391 gms. of sodium phenolate (2.93 moles plus 15% excess) over a period of 4 hours at $-4\pm4°$ C. After stirring the solution overnight, the aqueous layer was drawn off. The organic layer was then washed with 3–700 cc. portions of boiling 5% NaOH followed by 2–700 cc. portions of boiling water. After removal of traces of water and a small forerun, the product was collected at 155–160° C. at 1½ mm. Wt. of product= 722.8 gms. (77.4%), $N_D^{25}=1.4843$. H+=0.2 cc. of 0.1 N NaOH/10.0 gms.

| Analysis | Calculated | Found |
|---|---|---|
| P percent | 9.74 | 9.6 |
| Cl do | 11.1 | 11.2 |
| Phenol | nil | nil |
| $d_{25}^{25}$ | | 1.0823 |

*Example III.*— Iso-octyl monochloromethanephosphonic chloride was prepared in the manner of Example II using iso-octyl alcohol instead of 2-ethyl hexanol. 765.0 grams (2.93 moles) of this material was added dropwise, with stirring at 0–5° C., to a solution of sodium phenolate prepared by dissolving 134.8 grams NaOH (2.93 moles+15% excess) in 990 ml. of water and adding 317.4 grams of phenol (2.93 moles+15% excess). After a reaction time of approximately 5 hours the mixture was stirred overnight in an ice bath. The solution was placed in a separatory funnel and the aqueous layer removed. The organic layer was then washed with 250 ml. of 5% NaOH solution followed by two 250 ml. water washes. Traces of water and phenol were removed by distillation after which a crude isooctyl phenyl monochloromethanephosphonate was recovered by distillation. This product was washed with 2–500 ml. portions of boiling 5% NaOH solution followed by 3–500 ml. portions of boiling water. Traces of water were evaporated off and the product recovered by distillation at 155–175° C. at 1.5–2.5 mm. pressure. The isooctyl phenyl monochloromethanephosphonate product weighed 560 g. representing a yield of 60.5%. It had an index of refraction $N_D^{25}=1.4840$, a density $$d_{25}^{25}=1.0804$$

and an acidity of 0.3 cc. N/10 NaOH per 10 grams. Analysis showed 9.7% P and 11.1% Cl. It contained no trace of phenol.

*Example IV.*—Butyl cresyl monochloromethanephosphonate was made in the following manner:

In a 3-necked flask was placed 335 grams (2.0 moles) of chloromethanephosphonic dichloride ($ClCH_2POCl_2$). The system was cooled to 10° C. and evacuated to 50 mm. pressure and 148.2 grams (2.0 moles) of n-butanol added dropwise with stirring over a 1½ hour period. The solution was stirred an additional hour and the system evacuated overnight at a pressure of 2.0 mm. to remove the liberated hydrogen chloride. The residual butyl monochloromethanephosphonic chloride had an index of refraction $N_D^{25}=1.4595$. This product was then reacted with sodium cresylate to produce the butyl cresyl ester under the following procedure.

A 45% aqueous solution of 196.0 grams (1.8 moles plus 15% excess) of sodium cresylate was placed in a reaction flask and cooled to 5° C. and then 368.2 grams of the above butyl chloromethanephosphonic chloride (1.8 moles) was added dropwise with stirring while maintaining a temperature of 3–5° C. The addition time was 5½ hours. The solution was stirred overnight and then placed in a separatory funnel where the aqueous layer was removed. The crude product was then washed three times with 300 ml. portions of a 5% NaOH solution, followed by three washes with 300 ml. portions of boiling water. The washed product was placed in a distilling setup where the traces of water were flash distilled, after which the product was fractionated. The recovered butyl cresyl monochloromethanephosphonate ester had an index of refraction $N_D^{25}=1.4992$ and a boiling point of 150–155° C. at 1.5 mm. pressure. Analysis showed 11.1% P and 13.1% Cl compared to the calculated values of 11.2% P and 12.9% Cl.

Density $d_{25}^{25}$ was 1.1572

*Example V.*—Beta-chloropropyl cresyl monochloromethanephosphonate was prepared as follows:

239.0 grams (1.0 mole) of cresyl monochloromethanephosphonic chloride, prepared as in the first step of Example I, and 4.5–5.0 grams titanium tetrachloride were placed in a reaction flask and 63.9 grams (1.0 mole plus 10% excess) of propylene oxide were added, with stirring, below the surface of the liquid over a period of 38 minutes while maintaining the temperature at 30–35° C. with ice water cooling. The reaction mixture was stirred an additional hour without cooling, then washed successively with 295 grams of 10% sodium citrate, 250 ml. water and 250 ml. of a 10% sodium bicarbonate solution. The organic layer was separated and stripped of volatiles to 85° C. at 2 mm. pressure. The product was then distilled yielding 245.8 grams (82.8%) of water white β-chloropropyl cresyl monochloromethanephosphonate having a boiling point of 130–135° C. at 0.5 mm. pressure, an index of refraction $N_D^{25}=1.5142$ and a density $$d_{25}^{25}=1.2728 \text{ g./ml.}$$

Analysis of the product showed 10.4% P and 24.0% Cl compared to calculated values of 10.4% P and 23.9% Cl.

In the preparation of the above mixed ester products it is preferred to carry out the reactions in two steps to prevent the uncontrolled formation of mixtures of diesters. Generally it is preferred to first react the phenol or cresol with the chloromethanephosphonic dichloride in proportions to produce the aryl chloromethanephosphonic monochloride, and after removal of the liberated hydrogen chloride reacting the monochloride ester with a sodium alcoholate to introduce the alkyl radical with liberated hydrogen chloride being removed as sodium chloride. The reverse order of introducing the alkyl and aryl radicals represents a workable procedure though product yields are somewhat lower when the lower alcohols are used.

The new alkyl aryl esters of this invention have been found to be excellent plasticizers for ethyl cellulose, nitrocellulose and vinyl chloride vinyl acetate resin products.

Plasticized resin products may be produced by intimately mixing with the desired resin material a plasticizing proportion of the alkyl aryl monochloromethanephosphonate, with or without the aid of suitable solvents. In general, it has been found that desirable plasticizing effects may be obtained where the proportion of the plasticizing ester is within the range of 20 to 40 parts by weight per 100 parts of the resin to be plasticized. Such plasticized products are suitable for use as molding compounds or in the form of films or coatings in a variety of commercial applications.

Evaluation of the new ester products as plasticizers was made by dissolving the resin and plasticizer compound in a suitable mutual solvent, casting films therefrom of uniform thickness and evaporating off the solvents to obtain dry plastic films. Films were made using Vinylite (a copolymer of 80–95% vinyl chloride and 20–5% vinyl acetate), ethyl cellulose, and nitrocellulose and several plasticizing proportions of the alkyl aryl monochloromethanephosphonates. The films were then tested to evaluate the plasticizer and determine the characteristics of the plasticized resin products. Some typical examples are shown in the following table.

Film clarity is determined by visual observation of the film, and is a measure of the compatibility of the resin and the plasticizer. Cloudiness in the film is an indication of incompatibility, the degree of cloudiness being more or less a qualitative determination of the degree of incompatibility.

"Exudate" is a term used to designate the presence of exuded plasticizer on the surface of the plasticized resin film. Its presence or absence is determined by rubbing a cigarette paper over the surface of the film (previously dried for 4 hours at 80° C.) and noting whether or not the paper shows any absorption of the plasticizer. The test is a measure of compatibility not observable by the clarity of film test.

| Resin | Plasticizer | Ratio Resin/ Plasticizer | Solvent | Film Clarity | Exudate | Low Temp. Flexibility | Plasticity | Flammability |
|---|---|---|---|---|---|---|---|---|
| | A | | | | | | | |
| Vinylite (Copolymer of 95% vinyl chloride and 5% vinyl acetate). | Isooctyl phenyl Monochloromethanephosphonate. | 100/20 100/30 100/40 | methylethyl ketone do do | clear do do | none do do | fair do do | good excellent do | self-ext. Do. Do. |
| | B | | | | | | | |
| Do | 2-ethylhexyl phenyl monochloromethanephosphonate. | 100/30 100/40 | do do | do do | do do | poor fair | poor excellent | Do. Do. |
| | C | | | | | | | |
| Do | Butyl cresyl monochloromethanephosphonate. | 100/20 100/30 100/40 | do do do | do do do | do do do | poor do fair | good excellent do | Do. Do. Do. |
| | D | | | | | | | |
| Do | Methyl cresyl monochloromethanephosphonate. | 100/20 100/30 100/40 | do do do | do do do | do do do | poor do do | poor excellent do | Do. Do. Do. |
| | E | | | | | | | |
| Do | β-chloropropyl cresyl monochloromethanephosphonate. | 100/20 100/30 100/40 | do do do | do do do | do do do | do do do | poor good excellent | Do. Do. Do. |
| Ethyl Cellulose | A | 100/30 | mix. of ethanol and toluene. | clear | do | good | fair | flamm. |
| Do | B | 100/30 | | do | do | do | poor | Do. |
| Do | C | 100/30 | | do | do | do | fair | Do. |
| Do | D | 100/30 | | do | do | do | poor | Do. |
| Do | E | 100/30 | | do | do | do | fair | Do. |
| Nitro Cellulose | A | 100/30 | mix. of methyl ethyl ketone, butyl acetate, toluene and ethanol. | clear | do | poor | do | Do. |
| Do | B | 100/30 | | do | do | do | do | Do. |
| Do | C | 100/30 | | do | do | do | do | Do. |
| Do | D | 100/30 | | do | do | do | do | Do. |
| Do | E | 100/30 | | do | do | do | do | Do. |

Qualitative low temperature flexibility tests were made by immersing film specimens in a vessel at minus 50° C. and bending the films with tongs a number of times to determine whether the film cracks, breaks or remains suitably flexible at the low temperature. Most of the esters are satisfactory plasticizers in the low temperature range.

General plasticity of the plasticized films at room temperature were determined organoleptically by several observers to determine the degree of excellence of the plasticity effect.

From the foregoing table it may be seen that the new ester compounds have a good to excellent plasticizing effect on a number of commercial resin materials, particularly when the proportion of the plasticizer used is at least 30 parts per 100 parts of the resin. The plasticized resin materials represent new and commercially useful products.

The new esters have excellent thermal stability and viscosity characteristics which make them highly suitable for use as hydraulic fluids in torque converters, hydraulic control mechanisms, etc. These characteristics are shown in the following table.

Thermal stabilities of the new ester compounds were determined by placing a 25 gram portion of the ester in a 3-necked flask equipped with stirrer and thermometer and heating at a temperature of 145–150° C. for 24 hours, and determining the degree of decomposition. The increased acidity as determined by titration with a normal caustic soda solution was used to calculate the percentage of decomposition of the ester.

Hydrolytic stability was determined by refluxing a mixture of 25 ml. water and 25 grams of the ester for a period of 24 hours, cooling and titrating the aqueous phase with ⅓ N caustic soda to determine developed acidity which was then calculated as percentage decomposition of the ester.

Viscosity determinations were made in accord with standard procedure outlined in ASTM test procedure D–445–52T and are reported as centistokes.

The thermal stabilities of the new esters are much superior to the widely used hydraulic fluids, diphenyl octyl phosphate and trioctyl phosphate which have comparative stabilities of 5.60 and 3.20 respectively.

The esters of this invention may be added to gasoline in small proportions or to lubricating oil as an additive.

The foregoing detailed description has been given for clearness of understanding only and no unnecessary limitations should be understood therefrom as modifications will be obvious to those skilled in the art.

We claim:

1. An alkyl aryl monochloromethanephosphonate of the formula,

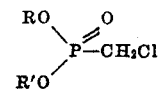

where R is selected from the group consisting of phenyl

| Ester | Density (g./ml.) | Viscosity, centistokes | | Thermal Stability, percent decomposition of ester | Hydrolytic Stability, percent decomposition of ester |
|---|---|---|---|---|---|
| | | 100° F. | 210° F. | | |
| Methyl cresyl monochloromethanephosphonate | 1.2548 | 30.2 | 4.28 | 2.49 | 82.3 |
| 2-ethylhexyl phenyl monochloromethanephosphonate | 1.0823 | 12.2 | 3.02 | 2.82 | 1.58 |
| Isooctyl phenyl monochloromethanephosphonate | 1.0804 | 13.9 | 3.15 | 2.02 | 4.66 |
| Butyl cresyl monochloromethanephosphonate | 1.1572 | 10.3 | 2.64 | 0.69 | 5.56 |
| Beta-chloropropyl cresyl monochloromethanephosphonate | 1.2728 | 12.6 | 2.77 | 0.87 | 0.35 | and cresyl radicals, and R' is selected from the group consisting of alkyl and chloroalkyl radicals of one to eight carbon atoms.

2. Butyl cresyl monochloromethanephosphonate.
3. 2-ethylhexyl phenyl monochloromethanephosphonate.
4. Isooctyl phenyl monochloromethanephosphonate.
5. Beta-chloropropyl cresyl monochloromethanephosphonate.

References Cited in the file of this patent

UNITED STATES PATENTS

| | | |
|---|---|---|
| 2,133,310 | Shuman | Oct. 18, 1938 |
| 2,390,258 | Katz et al. | Dec. 4, 1945 |
| 2,518,692 | Hull et al. | Aug. 15, 1950 |
| 2,599,761 | Harmon et al. | June 10, 1952 |
| 2,636,862 | Watson | Apr. 28, 1953 |
| 2,676,160 | Ochoa | Apr. 20, 1954 |
| 2,694,689 | Gamrath et al. | Nov. 16, 1954 |